(12) United States Patent
Rathore

(10) Patent No.: US 12,118,528 B2
(45) Date of Patent: Oct. 15, 2024

(54) ENABLING INFLUENCER-DRIVEN COMMERCE THAT TRACKS AND ATTRIBUTES MULTIPLE INFLUENCER CONTRIBUTIONS AND DISTRIBUTES AVAILABLE FEES

(71) Applicant: Awake Market, Inc., San Mateo, CA (US)

(72) Inventor: Amit Rathore, San Mateo, CA (US)

(73) Assignee: Awake Market, Inc., San Mateo, CA (US)

( * ) Notice: Subject to any disclaimer, the term of this patent is extended or adjusted under 35 U.S.C. 154(b) by 0 days.

(21) Appl. No.: 17/362,983

(22) Filed: Jun. 29, 2021

(65) Prior Publication Data

US 2022/0101289 A1 Mar. 31, 2022

Related U.S. Application Data

(60) Provisional application No. 63/034,168, filed on Jun. 3, 2020.

(51) Int. Cl.
*G06Q 20/12* (2012.01)
*G06F 21/10* (2013.01)
*G06Q 20/10* (2012.01)

(52) U.S. Cl.
CPC ......... *G06Q 20/1235* (2013.01); *G06F 21/10* (2013.01); *G06Q 20/102* (2013.01)

(58) Field of Classification Search
CPC .................. G06Q 20/00–425; G06F 21/00–88
USPC ..................................................... 705/50–79
See application file for complete search history.

(56) References Cited

U.S. PATENT DOCUMENTS

| | | | |
|---|---|---|---|
| 7,337,133 B1* | 2/2008 | Bezos | G06Q 30/0242 705/7.32 |
| 2010/0094695 A1 | 4/2010 | Gaik | |
| 2010/0306041 A1* | 12/2010 | Karczewski | G06Q 40/02 705/14.16 |
| 2013/0066695 A1* | 3/2013 | Just | G06Q 30/02 705/14.16 |
| 2013/0197983 A1* | 8/2013 | Vel | G06Q 30/0282 705/14.16 |
| 2013/0275195 A1 | 10/2013 | Gabryelski et al. | |

(Continued)

FOREIGN PATENT DOCUMENTS

| | | | | |
|---|---|---|---|---|
| KR | 20190069916 A | * | 6/2019 | G06Q 10/06 |
| KR | 20200082955 A | * | 7/2020 | |
| WO | WO-2013151504 A1 | * | 4/2013 | |

OTHER PUBLICATIONS

International Search Report in PCT International Application No. PCT/US2021/039730, mailed Oct. 25, 2021.

*Primary Examiner* — Chenyuh Kuo
(74) *Attorney, Agent, or Firm* — Cognition IP, P.C.; Edward Steakley; Rajesh Fotedar

(57) ABSTRACT

Various embodiments of an apparatus, methods, systems and computer program products described herein are directed to generate a first digital media identifier related to a first user account and store data associated with a provenance of the first digital media identifier. Such embodiments further receive data indicating an interaction on a remote software platform(s) by a second user account with a publication of the first digital media identifier on the remote software platform(s).

17 Claims, 17 Drawing Sheets

(56) References Cited

U.S. PATENT DOCUMENTS

| | | | |
|---|---|---|---|
| 2013/0346172 A1* | 12/2013 | Wu | G06Q 30/0214 |
| | | | 705/14.16 |
| 2014/0025478 A1* | 1/2014 | Mischuk | G06Q 50/01 |
| | | | 705/14.41 |
| 2016/0088097 A1 | 3/2016 | Gardner et al. | |
| 2016/0283951 A1* | 9/2016 | Boss | G06Q 30/0201 |
| 2018/0158162 A1 | 6/2018 | Ramasamy | |
| 2019/0215565 A1 | 7/2019 | Webb et al. | |
| 2021/0119785 A1* | 4/2021 | Ben-Reuven | G06Q 30/0201 |
| 2021/0211781 A1 | 7/2021 | Speasl et al. | |

\* cited by examiner

| Order No. | No. of Items | Date & Time | Price | Earning | Network | Platform |
|---|---|---|---|---|---|---|
| 1525 ~1102 | 1 | Transaction date/time | $1 | $0.02 | ○○○ | ○ |
| 1476 | 1 | Transaction date/time | $100 | $2.85 | ○○○ | ○○ 604 |

| Product | | Quantity | Variant | Price | |
|---|---|---|---|---|---|
| 502 504 Selected Product to Cosell | | 1 | 10ML Spray | $100 | |

| Stage | Coseller | Earning | Date & Time | | |
|---|---|---|---|---|---|
| Introduction Payout | 1104 User Account ID | $2.85 | Transaction date/time | | 602 |
| Adjustment details unavailable | | | | | |

| 1454 | 1 | Transaction date/time | $100 | $11.25 | ○○○ | ○○ |

ENABLING INFLUENCER-DRIVEN COMMERCE THAT TRACKS AND ATTRIBUTES MULTIPLE INFLUENCER CONTRIBUTIONS AND DISTRIBUTES AVAILABLE FEES

CROSS-REFERENCE TO RELATED APPLICATIONS

This application claims the benefit of U.S. Provisional Application No. 63/034,168, filed Jun. 3, 2020, which is hereby incorporated by reference in its entirety.

SUMMARY

Various embodiments described here provide for significant improvements and advantages over conventional systems. Such embodiments generate a first digital media identifier related to a first user account and store data associated with a provenance of the first digital media identifier. Such embodiments further receive data indicating an interaction on a remote software platform(s) by a second user account with a publication of the first digital media identifier on the remote software platform(s).

In some embodiments, a software platform may have multiple user accounts that are either designated as cosell accounts, vendor accounts or network operator accounts. The software platform (i.e. "attribution platform") allows vendor accounts to upload catalogs of their products and/or services that includes product data identifying at least a product/service for sale and a corresponding price. Vendor user accounts may further upload to the attribution platform one or more business rules and/or payment rules that describe how to calculate network fees (i.e. transaction allocations) for any cosell user account(s) (or "coseller account") that influenced a purchase of a product offered. Various cosell user accounts may publish digital media identifiers about a vendor's product on remote software platforms.

The attribution platform detects interactions with the published digital media identifiers and captures provenance data and stores the provenance data on a persistent ledger. The published digital media identifiers refer to each other such that a chain of published digital media identifiers that experienced interactions on remote software platforms can be determined. Those cosell user accounts identified in the provenance data linked to the chain will be deemed as having influence on an eventual product purchase. The vendor's business rules determine a network fee for each cosell user account that represents a monetary value of an amount of influence from a respective cosell user account with regards to an eventual product purchase. According to some embodiments, a network fee is an amount of value (or percentage) that is allocated from a purchase price from the product purchase. For example, a network fee may indicate dispersal to a cosell user account of a certain percentage of profit derived from a purchase price of a product transaction For example, a business rule from a vendor user account executed by the attribution platform may determine that a certain portion of a purchase price associated with a product purchase transaction is to be dispersed to a cosell user account where that certain dispersed amount of money commensurate with the cosell user account's influence on the eventual product purchase transaction.

A cosell user account influences one or more product purchase transactions by deciding whether to publish various digital media identifiers on various remote software platforms. A cosell user account (first cosell user account) may select a particular product and a digital media identifier is generated based on the first cosell user account's selection of that particular product. Generation of the digital media identifier includes encoding various portions of the digital media identifier with data that represents the selected particular product and the first cosell user account.

The first cosell user account may publish the digital media identifier at a remote software platform such that it may be viewed and selected by users who have access that remote software platform. For example, a user may select the published digital media identifier. Such selection may be defined as an interaction and/or event. The attribution platform receives data related to selection of the published digital media identifier at the remote software platform and captures provenance data to be stored on a persistent ledger. For example, the attribution platform decodes the selected published digital media identifier in order to identify the corresponding product and the first cosell user account that published the digital media identifier. The attribution platform updates provenance data by recording the interaction with the published digital media identifier in the persistent ledger and associates the first cosell user account with the recorded interaction and further stores an identifier for the remote software platform.

In some embodiments, the user that selected the published digital media identifier may also have a corresponding cosell user account ("second cosell user account"). The second cosell user account may further select to also cosell that same product identified in the selected published digital media identifier. The attribution platform thereby generates a new digital media identifier with one or more encoded portions that identify the product, the second cosell user account and the published digital media identifier selected by the second cosell user account at the remote software platform. It is understood, that in such a scenario, the second cosell user account will be logged into the attribution platform and a corresponding user account at the remote software platform that selected published digital identifier will be linked back to the second cosell user account. As such, the second cosell user account and corresponding user account at the remote software platform may represent the same end user (i.e. individual, mobile device, etc.).

The attribution platform further generates provenance data related to the new digital media identifier based on the identified product, the second cosell user account and a reference to the selected published digital media identifier. Therefore, decoding the new digital media identifier in response to an interaction with a published instance of the new digital media identifier on a different remote software platform, reveals a reference back to the digital media identifier published by the first cosell user account. As such, a relationship is established between the first cosell user account's published digital media identifier and the second cosell user account's published digital media identifier. Since both digital media identifiers are stored on the persistent ledger in association with provenance data, provenance data can be accessed and processed according to a vendor accounts business rules to determine a measure of influence that is represented in the provenance data. Each cosell user account thereby receives a network fee that aligns (i.e. equals, represent, reflects) with their measure of influence.

Various embodiments of an apparatus, methods, systems and computer program products described herein are directed to an external sales protocol engine that is a component of the attribution platform that generates digital media identifiers as described herein—or the external sales protocol engine can be separate and communicate with the attribution platform In some embodiments, a cosell user account initiates a purchase of a product on behalf of another individual via the external sales protocol engine. The cosell user account selects a first vendor account to fulfill the product purchase transaction and selects a second vendor account to indicate the second vendor account is to receive a transaction allocation from the product purchase transaction. In such a scenario, the second vendor account is further considered as providing a certain measure of influence in the resulting product purchase transaction initiated by the cosell user account.

Various embodiments include a module(s) and/or one or more functionalities to redact privacy information/data, to encrypt information/data and to anonymize data to ensure the confidentiality and security of user and platform information/data as well as compliance with data privacy law(s) and regulations in the United States and/or international jurisdictions.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 11 is a diagram illustrating an exemplary environment in which some embodiments may operate.

DETAILED DESCRIPTION

Figure 1A:
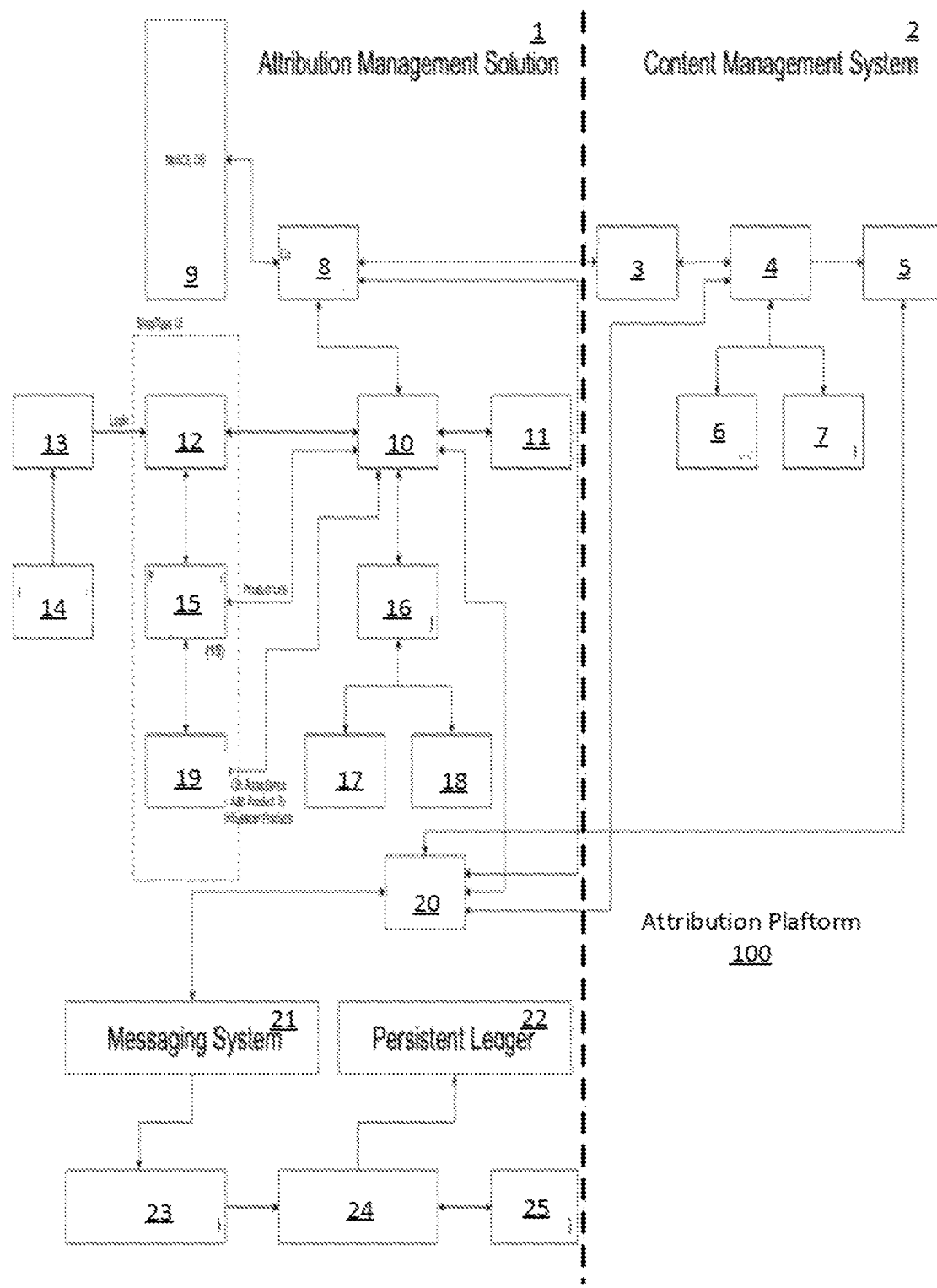
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the invention. The invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system(s). A computer system may include a processor, a memory, and a non-transitory computer-readable medium. The memory and non-transitory medium may store instructions for performing methods and steps described herein.

As shown in FIG. 1A, an end user(s) accesses an identity management system (1) and create a unique user account associated with the user login in order to join the software platform 100 ("attribution platform"). Upon logging in, a user account(s) associated with a vendor that has opted in to selling one or more products on the attribution platform access functionality of a product catalog importer (13) in order to seamlessly import product data from one or more product and service catalogs from one or more e-commerce engines onto the attribution platform. In various embodiments, a user account(s) associated with a vendor may manually create one or more product catalogs to be accessible on the attribution platform. When product data is accessible on the attribution platform, respective user accounts can browse one or more product catalogs and select various portions of product data to be published on remote social platforms and/or various remote digital media channels.

In various embodiments, a product data for a product(s) listed in a product catalog (s) may be associated with a unique tracking code embedded within a digital media identifier to enable tracking of any interaction with a potential customer and/or attribution platform user account and recording of events, interactions, data, sources related to one or more publications of various digital media identifiers related to product data on a persistent ledger (22).

Various embodiments described herein provide functionality to acquire real-time data on every interaction between a potential customer and an influencer. Various embodiments provide functionality for tracking a product's informational activity as respective digital media identifiers related to the product flow through multiple digital and social media channels, situated remotely from the attribution platform, up to a point of sale for an instance of a product described by product data provided by the respective digital media identifiers. For example, a digital media identifier may be a unique resource locator (URL). In various embodiments, the attribution platform generates one or more tracking codes that are embedded into a product URL via product link generator (11) that communicates with a system backend module(s) (10).

Various embodiments described herein provide functionality to attribute and/or apply a particular network fee structure that corresponds with a purchased product in order to determine transaction allocations that are to be dispersed to one or more attribution platform user accounts identified in provenance data associated with the product's traced informational activity.

As shown in FIG. 1A, the system backend module(s) (10) is linked with one or more product catalogs and various respective services that may be called by the attribution platform in order to generate a unique digital media identifier. Example, a unique URL link. In various embodiments, for each product SKU identifier that has been imported via the product import engine (16) onto the attribution platform, one or more the system backend module(s) (10) generates a unique digital media identifier used to track all user interactions and stores tracked information into a database. For example, a database may be a persistent ledger (22).

In various embodiments, a digital media identifier(s) for a particular product can be published on any social/digital media platform for tracking and decoding. A digital media identifier(s) may be tracked in order to determine the influence of one or more attribution platform user accounts have on a sale journey that ultimately result in a purchase of an instance of that particular product. A digital media identifier(s) may be decoded according to a node decoder (23) and a protocol converter (24) in order to identify the provenance of various interactions and events along the sale journey.

The one or more the system backend module(s) (10) may further access, process and or manage one or more business rules in communication with a rules engine (25) that calculates transaction allocations, such as network fees and adjustment payouts that are to be settled. For example, one or more business rules may be one or more payment rules. In various embodiments, the business rules and/or payment rules are provided to the attribution platform from vendor user accounts associated with vendors that are external to the attribution platform.

Various embodiments described herein further provide functionality for accurately attributing a network fee structure to one or more attribution platform user accounts involved in the sale journey that leads to the product purchase. A data storage service engine (20) captures various types of data associated with interactions with digital media identifiers. It is understood that the data storage service engine (20) may capture data from any number of interactions and/or events triggered across a multitude of remote and disparate software platforms and/or computer networks.

The node decoder (23) provides for attribution functionality and accesses the data captured by the data storage service engine (20) and decodes the accessed data to identify (i.e. detect, surface, harvest, infer) one or more relationships represented in the captured data in order to quantify the influence, on a product purchase, provided by each corresponding attribution platform user account involved in the sale journey. The node decoder (23) connects the messaging system (21) with the rules engine (25) to decode and connect various data points triggered by every interaction and/or event.

Accordingly, the attribution platform captures data involved in an entire chain of interactions and/or events related to respective digital media identifiers for a particular product that may be published across different remote (external) social and/or digital media software platforms. The attribution platform determines relationships between user accounts associated with the respective digital media identifiers and the respective interactions and/or events in order to attribute a network fee payout structure that maps to the determined relationships in alignment with the business rules and/or payment rules set up by vendor user accounts.

It is understood that any kind of data described herein may be stored in the persistent ledger (22) whereby the persistent ledger (22) maintains data and records that correspond to one or more transactions between any two nodes identified by the node decoder (23).

Upon completion and settlement of any transaction that corresponds to a product purchase in the persistent ledger (22), one or more external entities associated with respective vendor user accounts may trigger the disbursement of network fees, such as transaction allocations, earned by the attribution platform user accounts represented in the determined relationships. Each attribution platform user account may have a corresponding digital wallet at which revenue and network fees are credited.

In various embodiments, persistent ledger (22) it is immutable and all transactions (and any data related to the transactions and/or linked to the transactions) our permanent. As such, upon reversal of one or more transactions, a new series of one or more separate reversal transactions are triggered and thereby recorded. The immutable nature of the persistent ledger (22) thereby guarantees a soul version of "truth" all transactional data related to the attribution platform and provides for a completely transparent and verifiable audit and analysis of the attribution platform.

As further shown in FIG. 1A, a marketplace protocol 3 provides a headless ecommerce experience with the ability to track and attribute the coseller accounts who help make a sale happen. This protocol 3 provides the API's that enable decoupling of the frontend user experience with the backend business logic. A marketplace instance 4 is a portion of the attribution platform 100 associated with a particular network account (or vendor account) that provides one or more products and/or commodities as being available for buying and coselling by one or more coseller accounts. A headless checkout integration 5 implements functionality of providing an experience that makes it frictionless for buyers to be able to checkout and purchase a product in whatever medium or network they are currently most engaged with the product. Various services 6, 7 provide the following tools and functionalities of authenticating users onto the network, providing money/digital wallet services.

A Catalog Management System 8 interfaces with one or more front-facing systems using the marketplace protocol 3. It is used to obtain data for any stores that a vendor account creates in order to get "buy me"/cosell buttons. A NoSQL database 9 provides the functionality of accessing and analyzing big data of products, cosellers, Networks, Vendors which are spread around in multiple virtual servers on the cloud.

A product link generator 11 creates unique links for each commodity/userid combination added to a vendor account's catalog. This unique URL helps track and attribute the right network fees for the coseller accounts as they go about with their activity of coselling across multiple networks and platforms by publication of digital media identifiers. An ST Dashboard 12 is a portal module available to vendor accounts (i.e. influencer, seller, 3rd party brands) which allows them to define brands, upload commodity catalogues, see commodity details and link commodities to influencers. The ST dashboard 12 supports browsing through all commodities that brands/sellers/influencers upload on to the attribution platform 100. A coseller account will have the ability to browse through the commodities for buy/sell transactions. The vendor accounts can invite any other vendor account and/or coseller account to help bring traffic to their pipelines.

Figure 4:
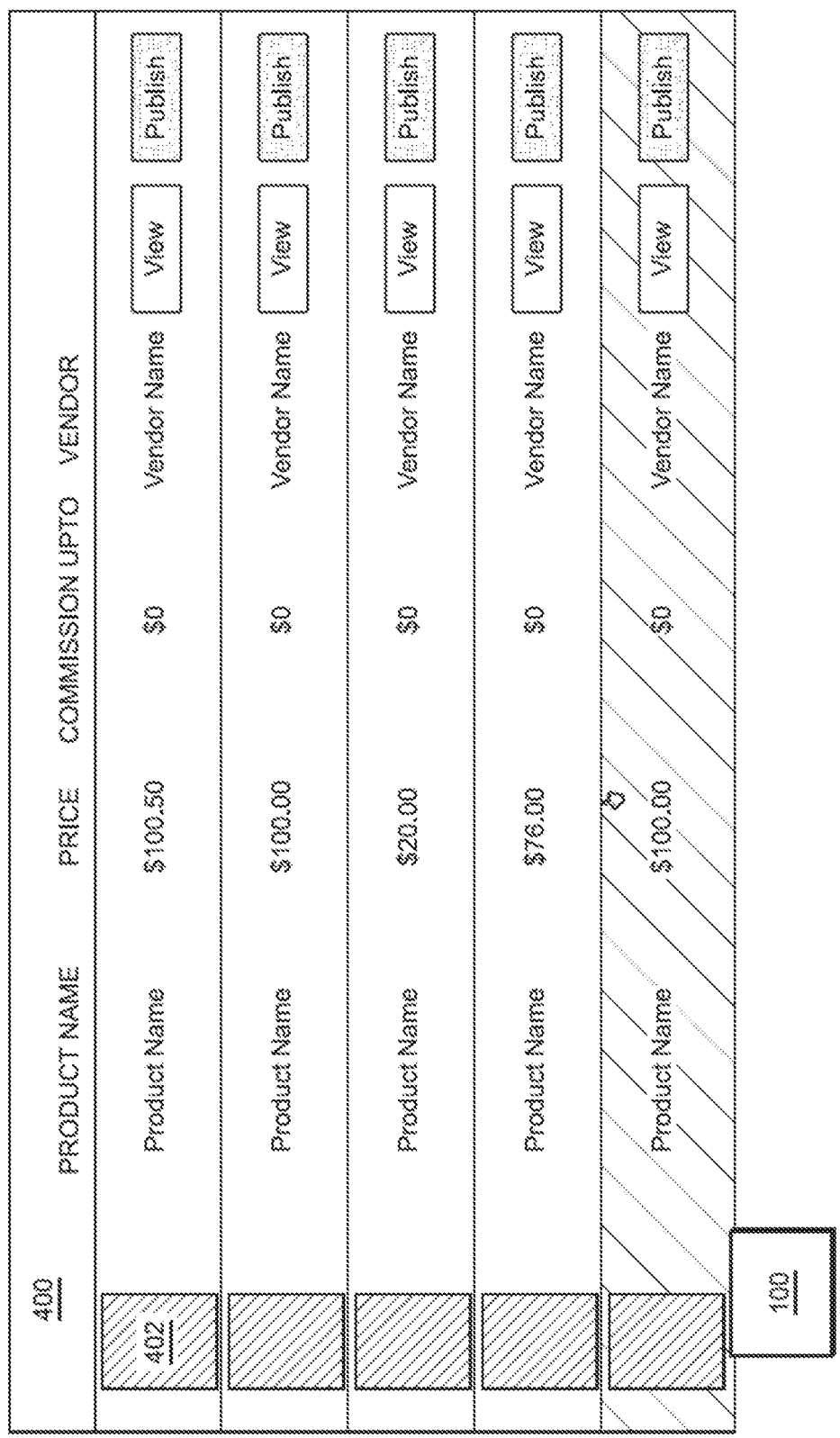
FIG. 4 is a diagram illustrating an exemplary environment in which some embodiments may operate.

An identity management system 13 provides authorization functionality for any type of account such as a coseller account or a vendor account or a network account—attempting to access the attribution platform 100. A product listing page 15 contains links for each product available for coselling (as shown in FIG. 4).

An CSV file 17 may include commodity or product data from a particular vendor account(s). An integration module 18 provides functionality and support for integrating any portion(s) of the attribution platform 100 with external 3rd-party ecommerce platforms.

Figure 1B:
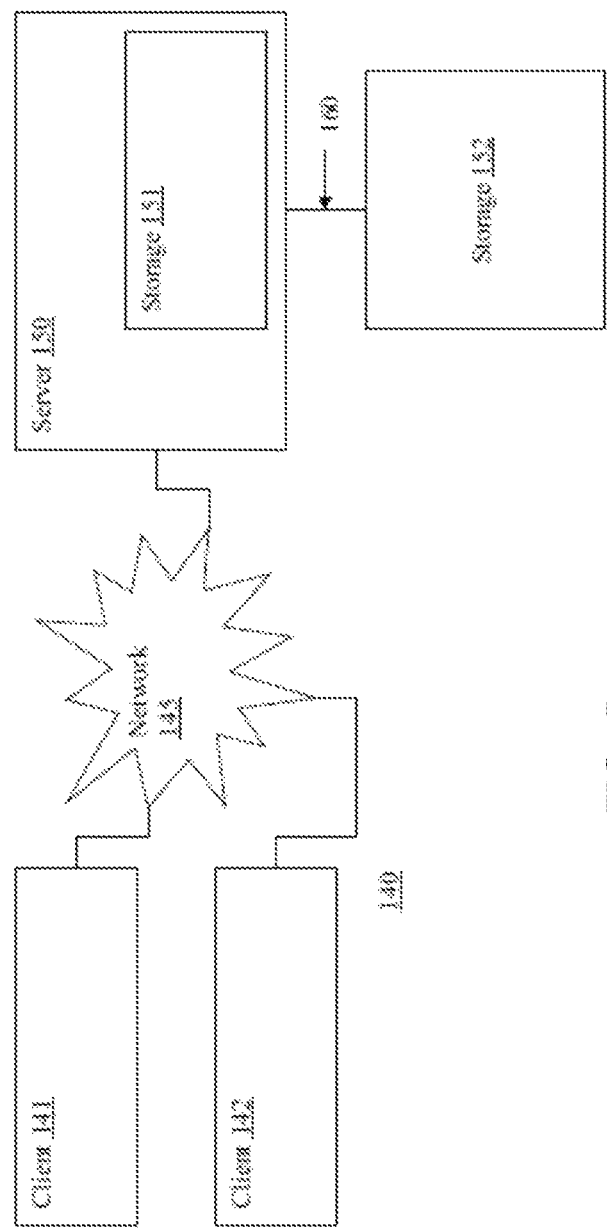
FIG. 1B is a diagram illustrating an exemplary environment in which some embodiments may operate.

As shown in FIG. 1B, In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1C:
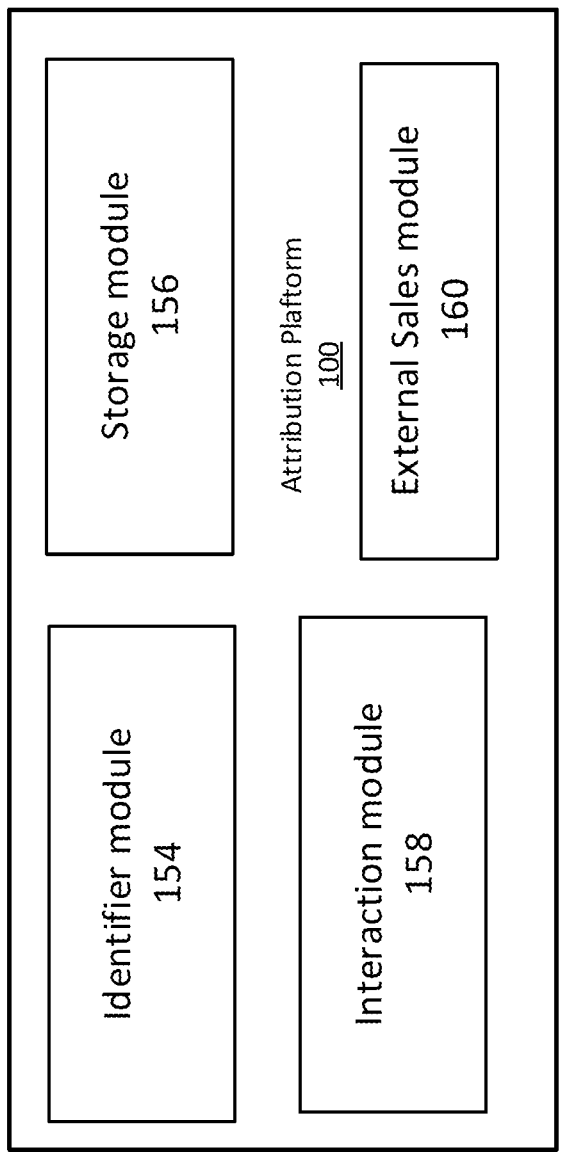
FIG. 1C is a diagram illustrating an exemplary environment in which some embodiments may operate.

FIG. 1C is a diagram illustrating exemplary software modules 154, 156, 158, 160 that may execute some or all of the functionality described herein. According to some embodiments, one or more of exemplary software modules 154, 156, 158, 160 may be components of the attribution platform 100.

Identifier module 154 functions to define, support, execute, and/or implement any of the functionalities, acts and/or operations described herein with regard to generating, encoding and decoding digital media identifiers.

Storage module 156 functions to define, support, execute, and/or implement any of the functionalities, acts and/or operations described herein with storing data, such as—for example—reading and writing to a persistent ledger, storing provenance data, updating provenance data, storing and managing a product catalog(s) and/or storing and managing business rules and/or payment rules.

Interaction module 158 functions to define, support, execute, and/or implement any of the functionalities, acts and/or operations described herein with regard to interactions and/or events.

External Sales module 160 functions to define, support, execute, and/or implement any of the functionalities, acts and/or operations described herein with regard to the external sales protocol engine. The external sales protocol engine may be a separate module that communicates with the attribution platform 100.

The above modules 154, 156, 158, 160 and their functions will be described herein in further detail in relation to FIGS. 2-14.

Figure 2:
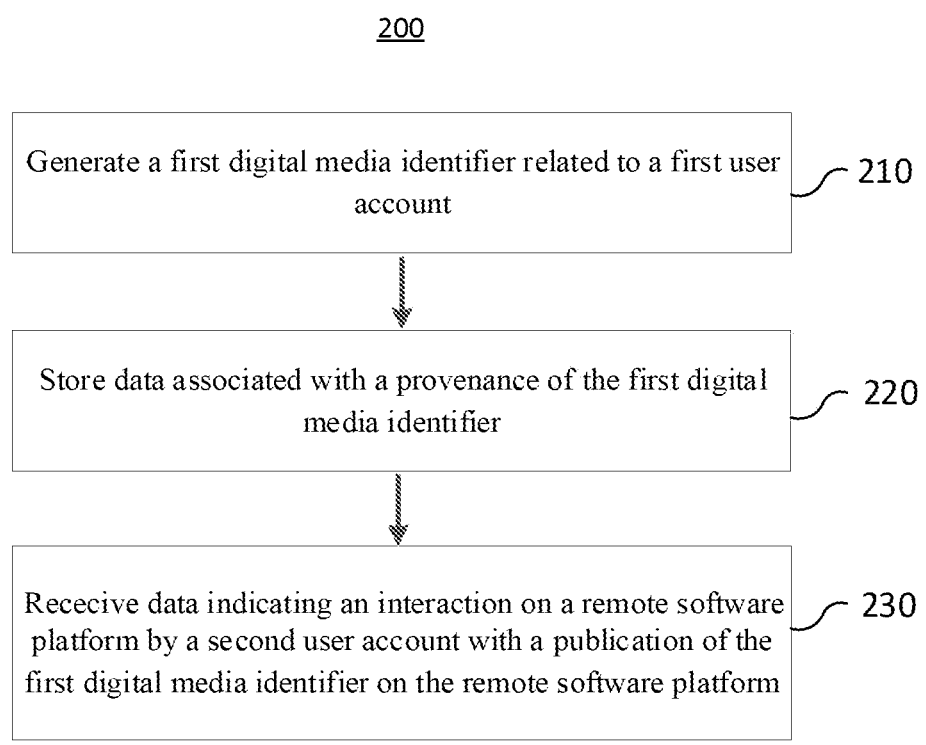
FIG. 2 is a diagram illustrating an exemplary method that may be performed in some embodiments.

As shown in flowchart 200 of FIG. 2, the attribution platform generates a first digital media identifier related to a first cosell user account. ("first user account"). (Act 210) For example, the first user account may select a product that the first user account wishes to cosell. The attribution platform generates and encodes a unique link, such as a URL, that has one or more encoded portions that identifies the selected product and/or the first user account. The unique link may further include one or more encoded portions that identifies where the first user account has selected to publish link.

The attribution platform stores provenance data of the first digital media identifier. (Act 220). For example, the attribution platform records the first digital media identifier, an identifier for the first user account and product data related to the selected product as provenance data on a persistent ledger. In some embodiments, the attribution platform updates the provenance data with an identification of where the first user account intends to publish the first digital media identifier before the first user account actually publishes the first digital media identifier.

The attribution platform receives data indicating interaction on a remote software platform by a second user account with a publication of the first digital media identifier on the remote software platform. (Act 230) The generated unique link may further enable customized digital media stored at the attribution platform to be accessed when publication of the unique link is selected by a user. For example, a user of a remote social network platform may view publication of the unique link as a result of the published unique link appearing in the user's social feed. The user may select the published unique link which triggers a request sent back to the attribution platform for access to the customized digital media about the product that corresponds with the published unique link. It is understood that the user selection of the published unique link in that user's social feed is considered an interaction and/or event that is to be captured and recorded by the shop type platform.

Upon receipt of the triggered request, the attribution platform will further receive request data representative of the published unique link. The attribution platform may then decode the unique link to determine that the unique link was published by a particular attribution platform user account that is identified according to embedded code at a portion of the link. Moreover, the attribution platform may further record the source of the triggered request as the remote social network platform at which the social feed is displayed.

Figure 3:
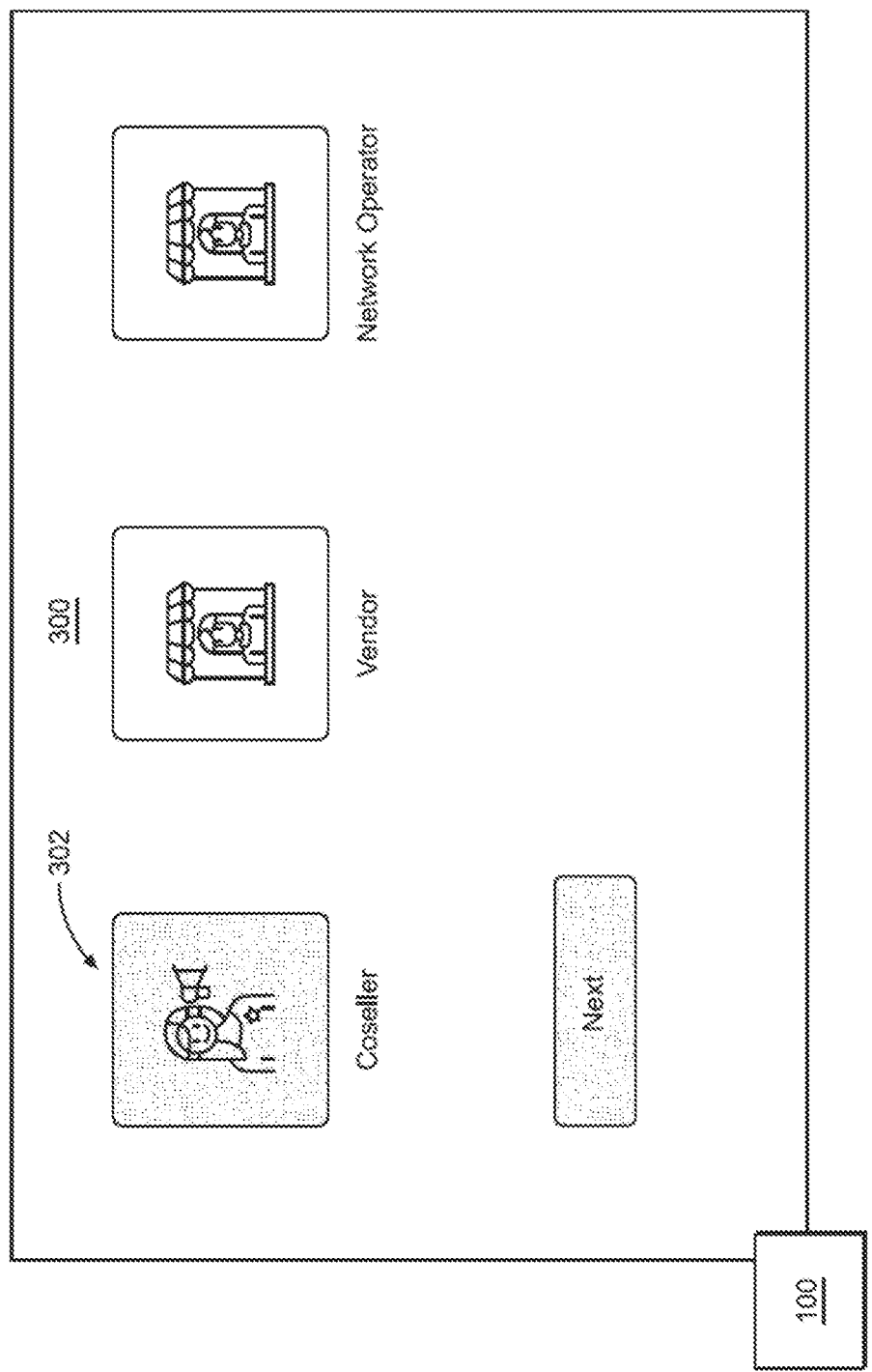
FIG. 3 is a diagram illustrating an exemplary environment in which some embodiments may operate.

As shown in user interface diagram 300 of FIG. 3, a user account registered on the attribution platform may select a coseller functionality in order to select one or more products the user account wishes to provide influence towards a sale of the selected product(s).

As shown in user interface diagram 400 of FIG. 4, product data may be displayed to one or more user accounts that have logged in to the attribution platform. For example, a user account may be able to browse different types of products from one or more catalogs of products and/or services. Each respective portion of product data may be displayed with a product image, 402, a product name, a price, a potential network fee amount and a vendor name that identifies an external vendor that is offering the product to be sold with a user account(s) acting as a coseller. The external vendor further provides the attribution platform with one or more business rules and/or payment rules for determining network fees and transaction allocations with regard to purchases of products identified in the vendors catalog(s). It is understood that the listing of product names as illustrated in FIG. 4 may be a list of different products offered by a same vendor account. A listing of product names may also be a list of different products offered by different vendor accounts.

Figure 5:
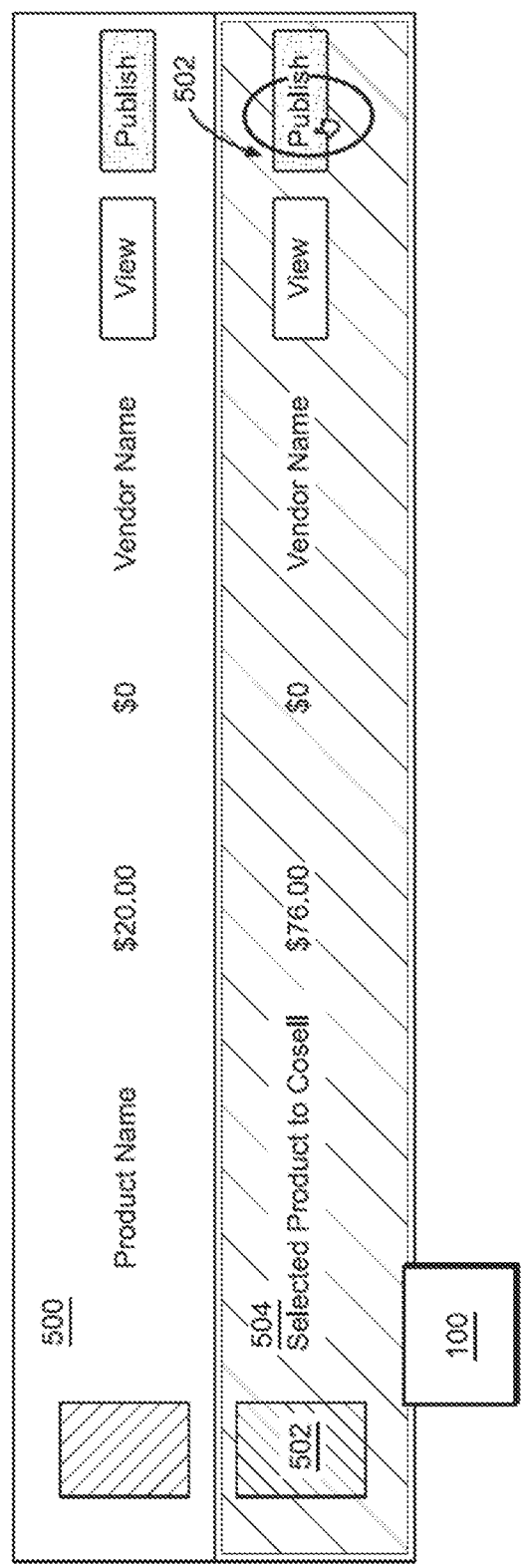
FIG. 5 is a diagram illustrating an exemplary environment in which some embodiments may operate.

As shown in user interface diagram 500 of FIG. 5, a user account may select a particular product 504 that the user account wishes to cosell. The selected product 504 may have a corresponding product image 502. The user account selects the particular product 504 by selecting a publish functionality 502.

Figure 6:
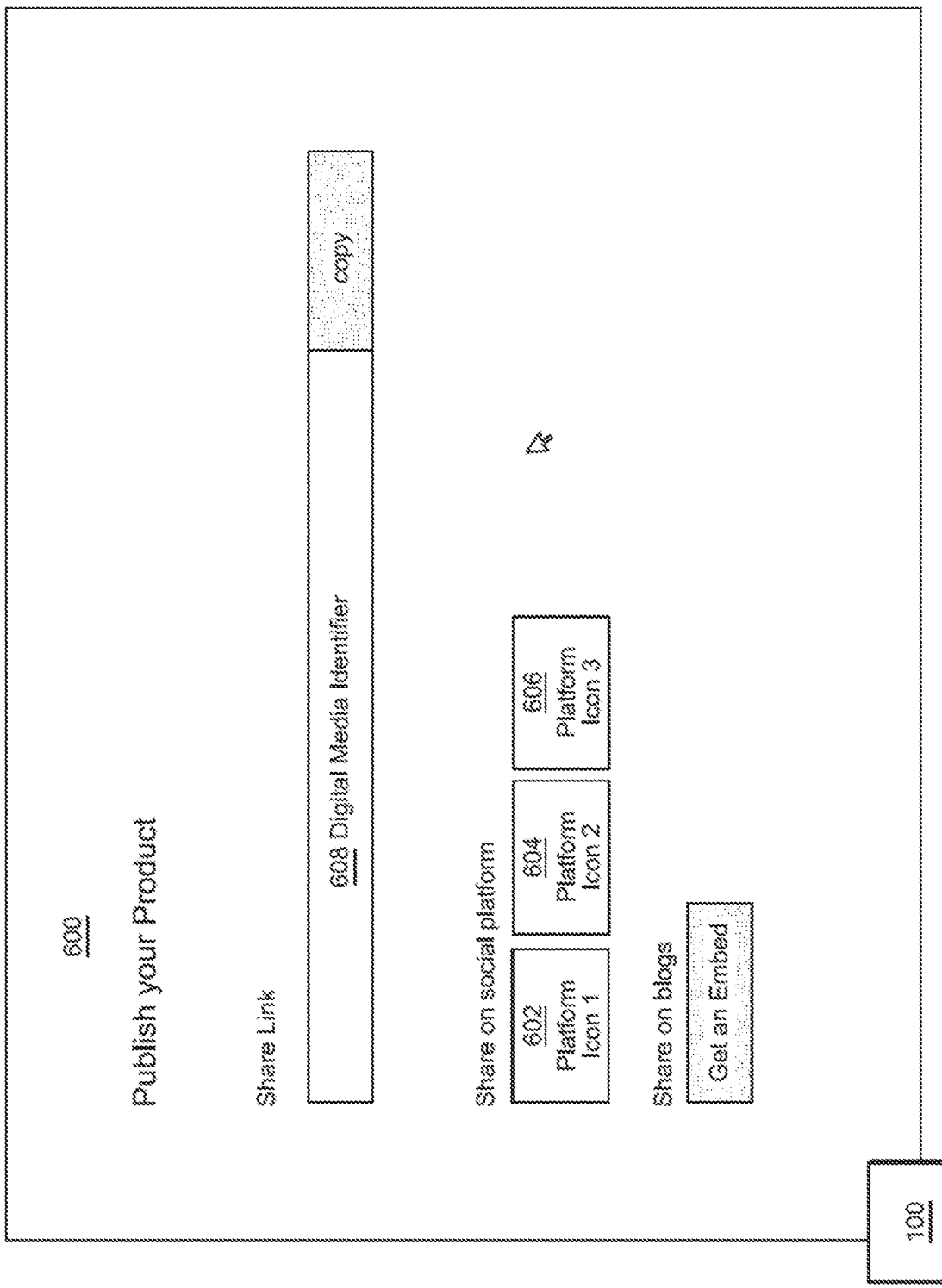
FIG. 6 is a diagram illustrating an exemplary environment in which some embodiments may operate.

As shown in user interface diagram 600 of FIG. 6, selection of the publish functionality 502, triggers display of a digital media identifier 608. In various embodiments, the digital media identifier 608 may include encoded content that identifies the product and the user account that selected the publish functionality 502. The user account may select an icon 602, 604, 606 that represents a respective remote software platform where the user account may publish the digital media identifier 608 in order to establish a portion of a potential sale journey towards a purchase of a product identified in the digital media identifier 608.

It is understood that, based on selection of a particular icon 602, the attribution platform may further store data representing the software platform that corresponds to the selected icon 602. Such data may be stored in relation to the digital media identifier 608 and data about the user account that selected the publish functionality 502. It is understood that all such data may be considered as a portion(s) of provenance data.

Figure 7:
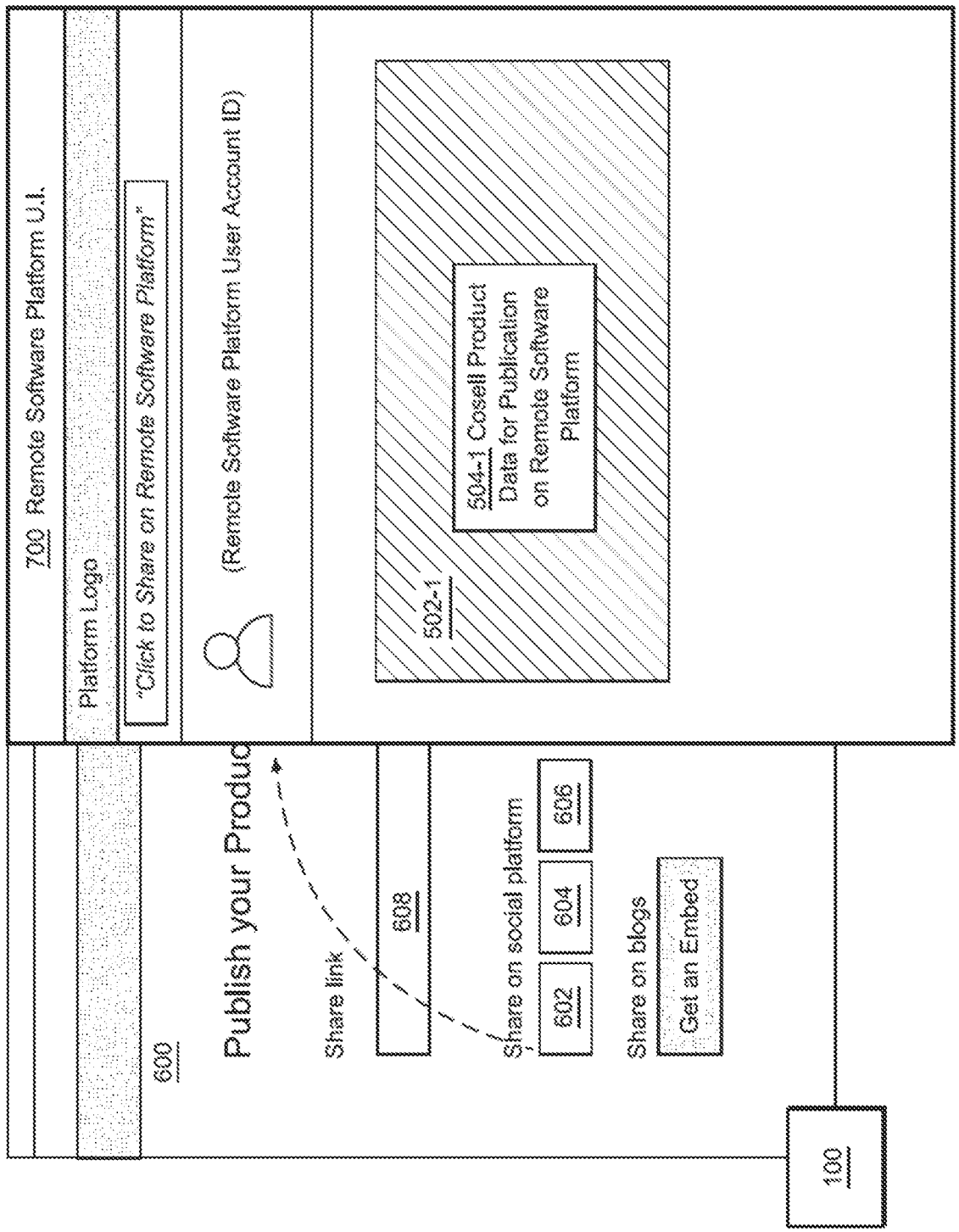
FIG. 7 is a diagram illustrating an exemplary environment in which some embodiments may operate.

As shown in user interface diagram 700 of FIG. 7, selection by the user account of a particular software platform icon 602, triggers an access request to a remote software platform that corresponds to the selected icon 602. Based on the access request, the remote software platform allows the attribution platform to display to the user account (of the attribution platform) a portion 700 of the remote software platform viewable to a remote software user account linked to the attribution platform user account that is attempting to cosell a product by publishing product data 504-1 about the product on the remote software platform. For example, publication of the product data 504-1 may further include exporting an instance of a corresponding product image 502-1 onto the remote software platform.

In some embodiments, the attribution platform updates provenance data that corresponds with the digital media identifier 608 prior to publication at the remote software platform. For example, upon selection of the particular software platform icon 602, the attribution platform updates the provenance data to indicate publication of the digital media identifier 608 at the remote software platform represented by the particular software platform icon 602.

Figure 8:
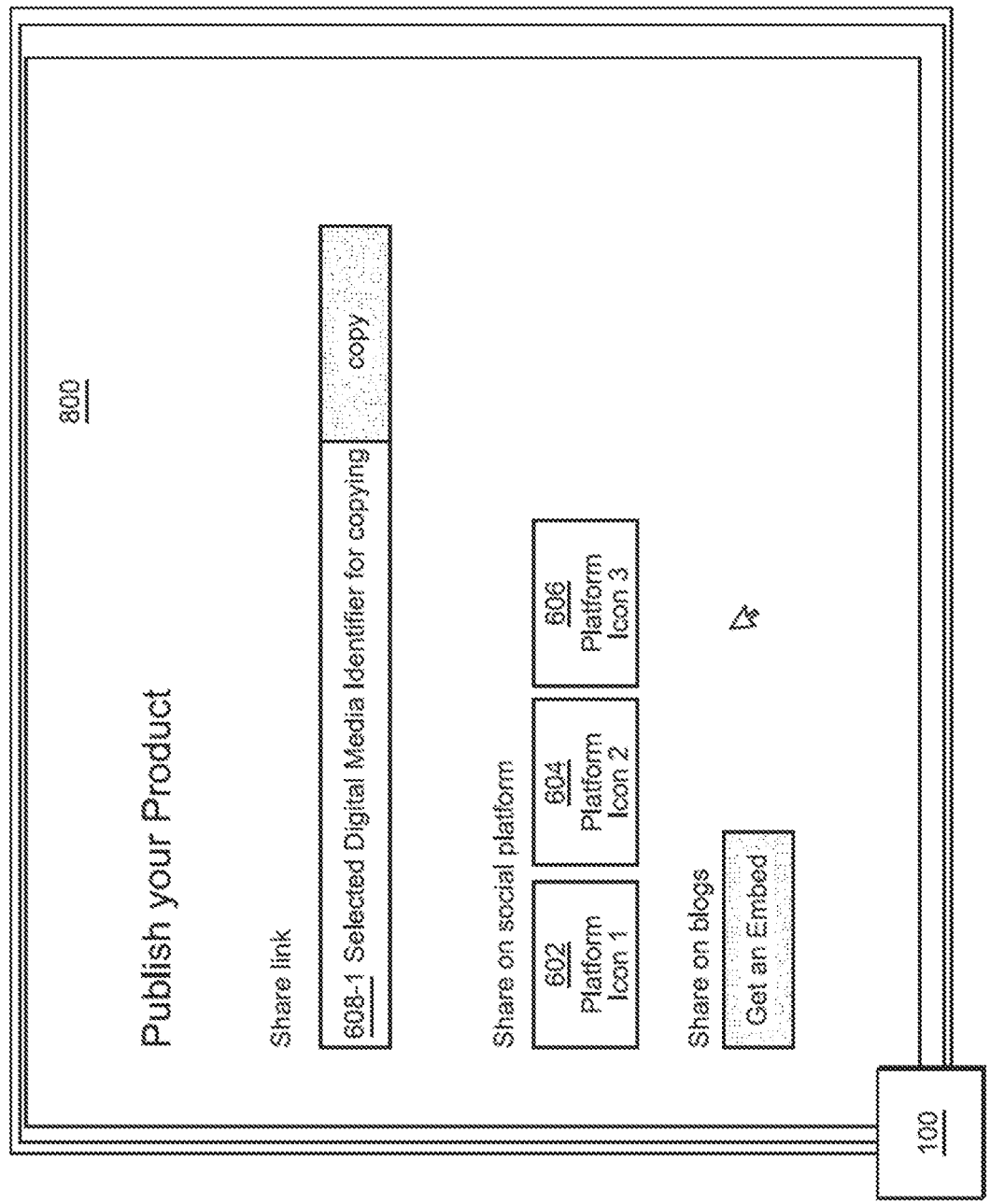
FIG. 8 is a diagram illustrating an exemplary environment in which some embodiments may operate.

As shown in user interface diagram 800 of FIG. 8, rather than publication of product data triggered by selection of a platform icon 602, 604, 606, the user account may the digital media identifier 608-1 and made thereby access a remote location (that is external to the attribution platform) and apply the copied digital media identifier 608-1 at the remote location such that it is displayable (i.e. published) to viewers of the remote location and can be selected by respective viewers accessing the remote location (such as a website). Such selection by respective viewers at the remote location may be identified by the attribution platform as an interaction/or event.

In various embodiments, the attribution platform updates provenance data that corresponds with the digital media identifier 608 in response to receipt of data related to an interaction with a published instance of the copied digital media identifier 608-1. For example, when the attribution platform receives an indication that an interaction with the published digital media identifier 608-1 has occurred at a remote software platform chosen by the user account, the attribution platform updates provenance data that corresponds with the digital media identifier 608 to indicate publication of the copied digital media identifier 608-1 at the remote software platform.

Figure 9:
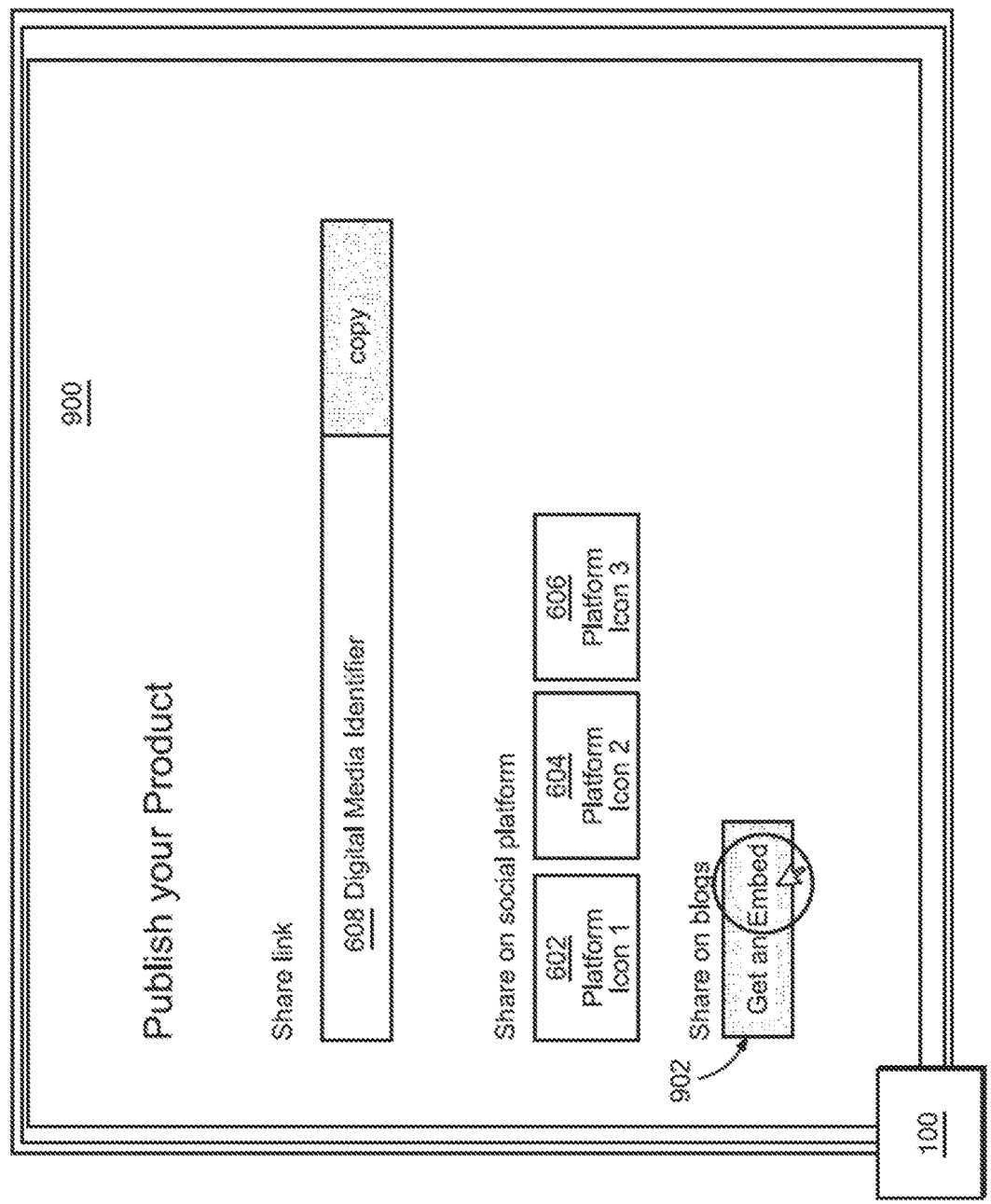
FIG. 9 is a diagram illustrating an exemplary environment in which some embodiments may operate.

As shown in user interface diagram 900 of FIG. 9, the user account may also select and embed functionality 902 instead of selecting a platform icon 602, 604, 606 or copying the digital media identifier 608.

Figure 10:
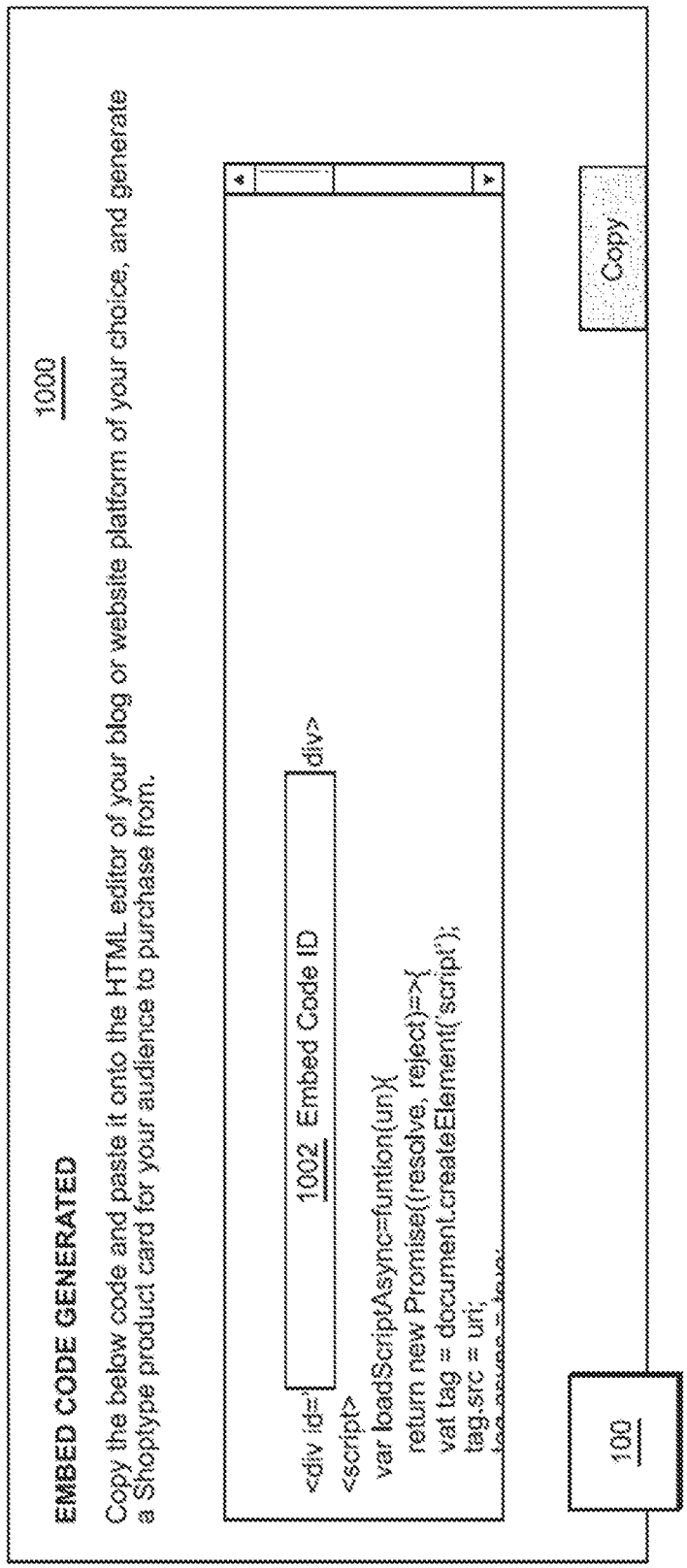
FIG. 10 is a diagram illustrating an exemplary environment in which some embodiments may operate.

As shown in user interface diagram 1000 of FIG. 10, selection of the embed functionality 902 triggers generation, by the attribution platform, of computer code with a particular identifier 1002. The computer code may be copied by the user account and then embedded in an external location. The external location may trigger execution of the embedded computer code which results in display of product data referenced by the digital media identifier 608. It is understood that the display of the product data at the external location resulting from execution of the embedded computer code allows for one or more viewers accessing the external location to interact with the displayed (i.e. published) product data.

As shown in user interface diagram 1100 of FIG. 11, the user account may access network fee data 1102 that identifies one or more selected products that the user account attempted to cosell by publishing respective digital media identifiers that correspond to the selected products and may further identify the various remote software platforms, websites, computer networks and/or digital media data locations at which the various instances of publication occurred. It is understood that the user account may have a user account identifier 1104 within the attribution platform.

Figure 12:
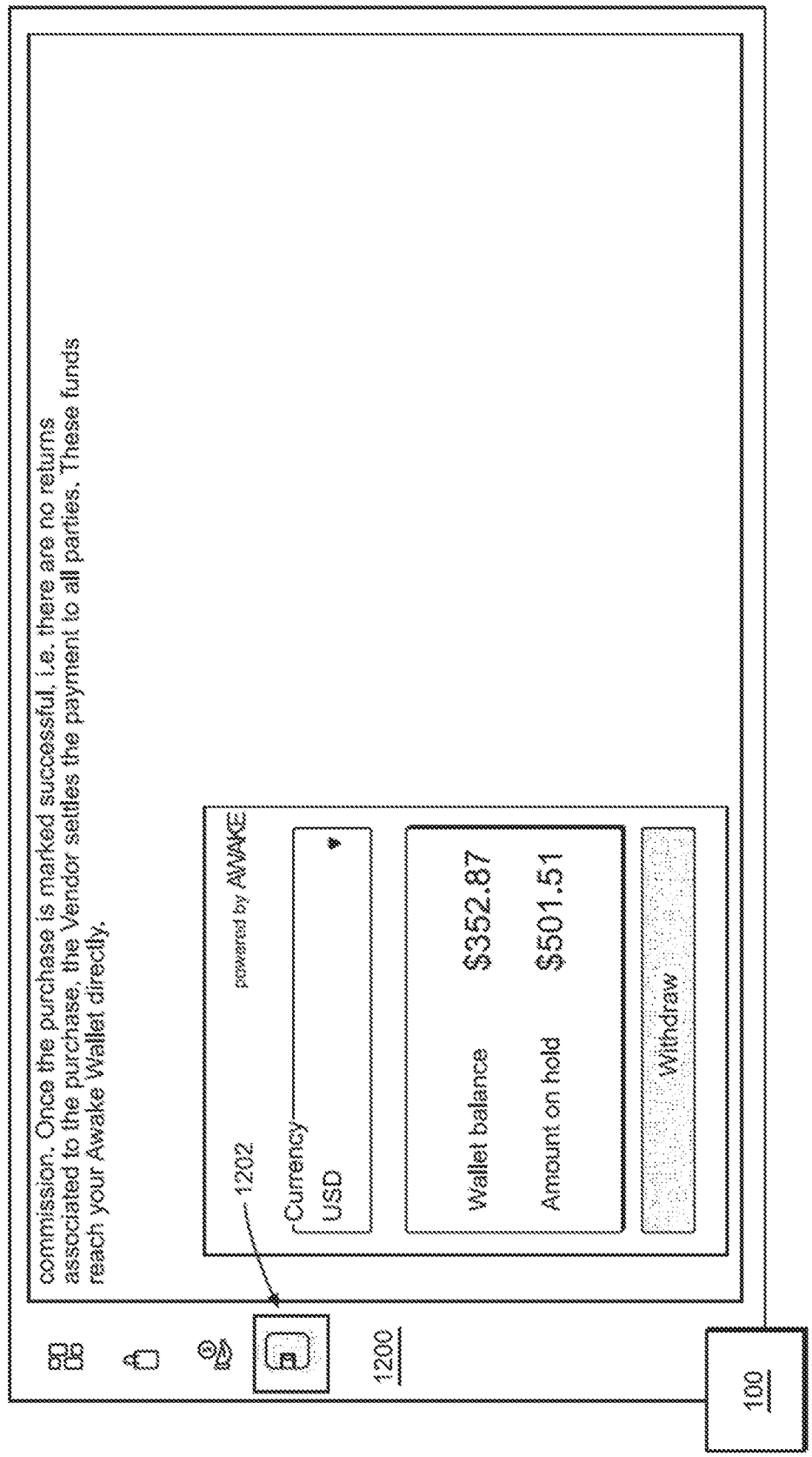
FIG. 12 is a diagram illustrating an exemplary environment in which some embodiments may operate.

As shown in user interface diagram 1200 of FIG. 12, the user account may access digital wallet data 1202 that presents a balance of money in a financial account associated with the user account. In various embodiments, the balance of money may be based on one or more transaction allocations dispersed to the user account. For example, a transaction allocation may be one or more network fees. It is understood that the attribution platform may calculate a transaction allocation based on a price of a transaction for a product purchase. The transaction may be associated with captured data representing various interactions, events, user accounts, digital media identifiers, remote software platforms. The user account may be identified by the attribution platform as the provenance of at least a portion of the captured data.

The attribution platform determines the user account's relationship with respect to all other user accounts identified as other sources of provenance in various portions of the captured data related to the product purchase. The user account's determined relationship can thereby be defined as that user account's influence in promoting the product purchase towards the eventual purchase transaction. The attribution platform further applies and/or executes one or more business rules and/or one or more payment rules to calculate an amount of money come measure it with user account's influence and that amount of money is dispersed the financial account.

Figure 13:
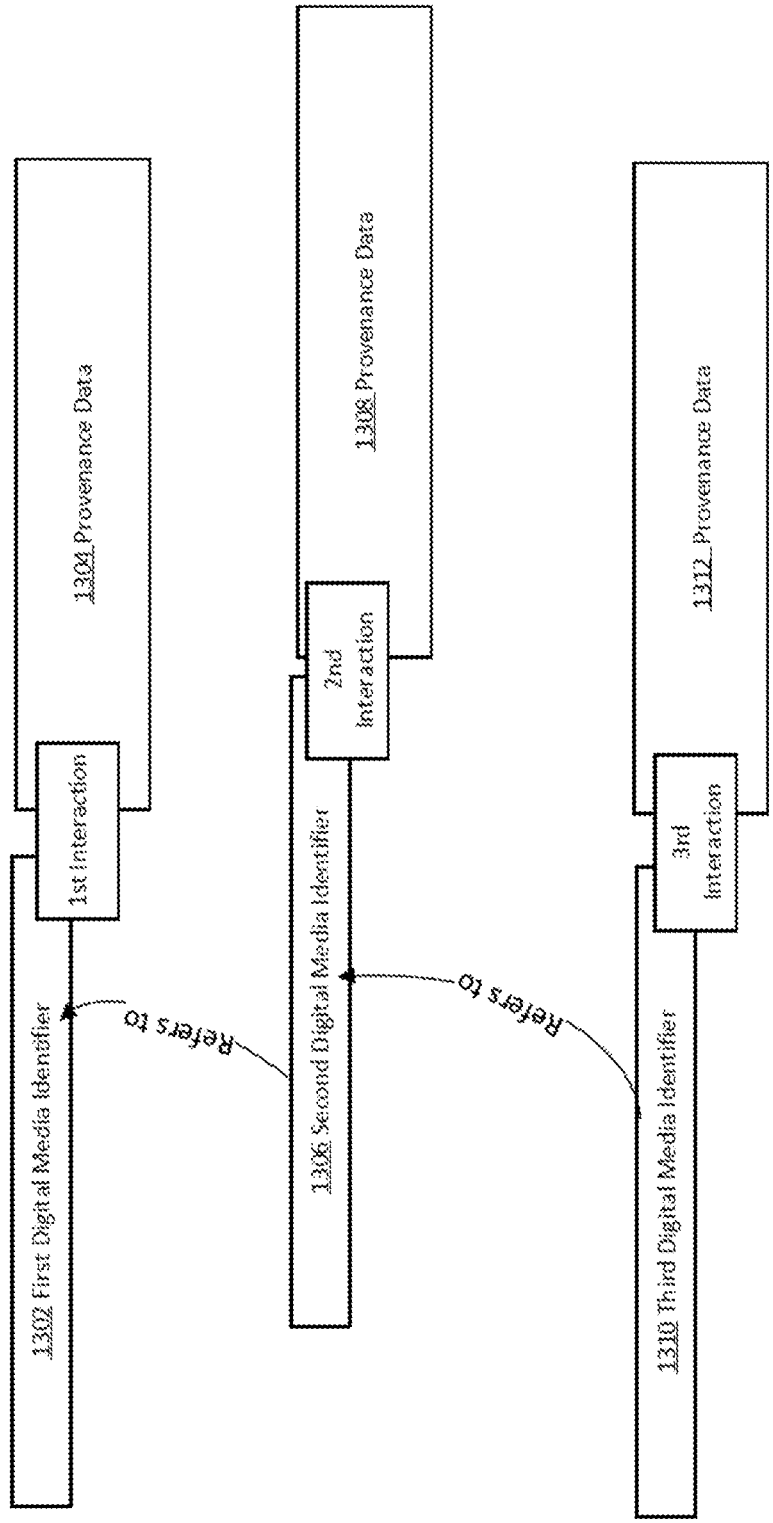
FIG. 13 is a diagram illustrating an exemplary method that may be performed in some embodiments.

As shown in diagram 1300 of FIG. 13, according to various embodiments, a first digital media identifier 1302 that was selected on a first remote software platform during a first interaction may be recorded on a persistent ledger in relation to provenance data 1304. The first digital media identifier 1302 may include one or more encoded portions that identifies a first user account and/or product data. The provenance data 1304 may represent at least one of: the first user account that published the first digital media identifier 1302, the first remote software platform, the type of interaction, and product data.

A second digital media identifier 1306 may be generated based on the first interaction with the first digital media identifier 1302. The second digital media identifier 1306 may include one or more encoded portions that refer to the first digital media identifier 1302. A second interaction with a publication of the second digital media identifier 1306 on a second different remote software platform may be recorded on the persistent ledger in relation to provenance data 1308. The provenance data 1308 may represent at least one of: a second user account that published the second digital media identifier 1306, the second remote software platform, the type of interaction, and product data.

A third digital media identifier 1310 may be generated based on the second interaction with the second digital media identifier 1306. The third digital media identifier 1310 may include one or more encoded portions that refer to the second digital media identifier 1306. A third interaction with a publication of the third digital media identifier 1310 on a third different remote software platform may be recorded on the persistent ledger in relation to provenance data 1312. The provenance data 1312 may represent at least one of: a third user account that published the third digital media identifier 1310, the third remote software platform, the type of interaction, and product data.

Figure 14:
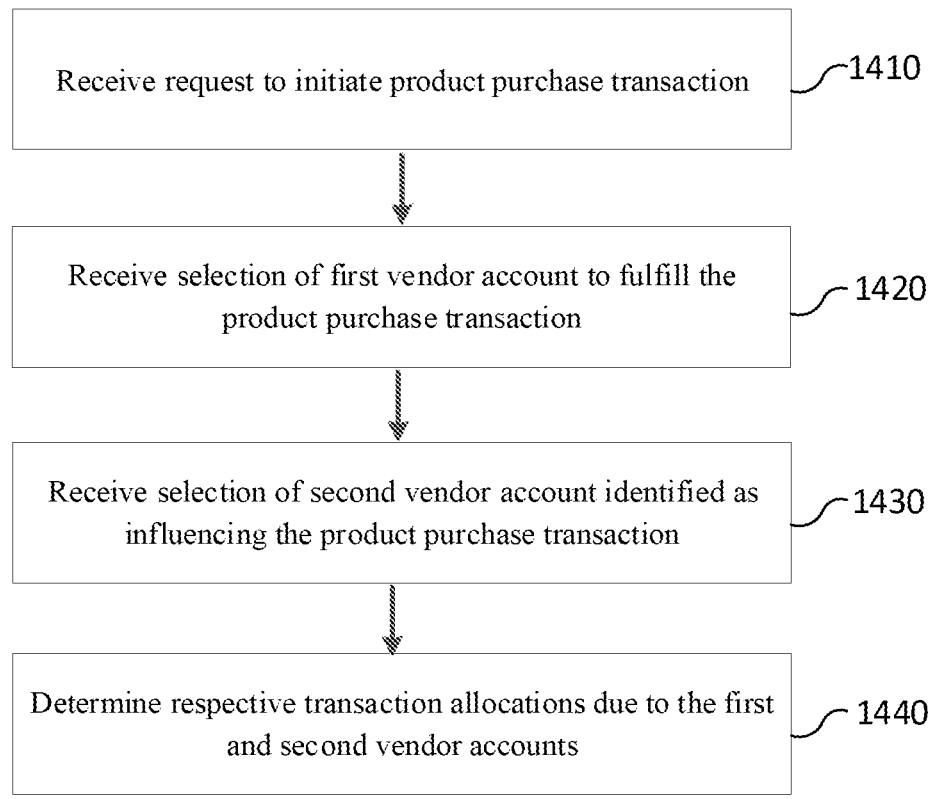
FIG. 14 is a diagram illustrating an exemplary environment in which some embodiments may operate.

As shown in flowchart 1400 of FIG. 14, the external sales protocol engine receives a request from a cosell user account to initiate a product purchase transaction via the attribution platform. (Act 1410) The external sales protocol engine receives a selection from the cosell user account of a first vendor account to fulfill the product purchase transaction. (Act 1420) The external sales protocol engine receives a selection from the cosell user account of a second vendor account that identifies the second vendor account as influencing the product purchase transaction (Act 1430) The external sales protocol engine (and/or the attribution platform) apply one or more business rules and/or one or more payment rules to determine respective transaction allocations due to the first and second vendor accounts. (Act 1440)

According to some embodiments, the first and second vendor accounts may each provide opt-in messages to the external sales protocol engine to allow cosell user accounts to act as externalized sales representatives of their products listed on the attribution platform. It is understood that a cosell user account that actually requests a product purchase transaction via the external sales protocol engine is not specifically identified to any vendor account that has sent an opt-in message. In addition, the opt-in messages further indicate the first and second vendor accounts approval to be selected as providing a measure of influence in the purchase of products from other vendor accounts. As such, the external sales protocol engine defines a product purchase transaction as involving multiple different vendor accounts even though a product will ultimately be purchased by a specific vendor account.

For example, an individual that corresponds to a first cosell user account ("first user account") may be physically interacting with a another individual at a retail location (i.e. physical retail space, chat message thread of a retail website) associated with a first vendor account that has opted into the external sales protocol engine. The individual convinces the other individual to purchase a particular product. The individual logs on as the first cosell user account and requests initiation of a product purchase transaction for the particular product that the other individual has been convinced to buy. However, the first user account requests that the product purchase transaction be fulfilled by a second vendor account. For example, the second vendor account may have a current lowest price for the particular product.

While the second vendor account will receive the order for the particular product, the first vendor account is identified as having provided a certain measure of influence in convincing the second user account to purchase the product from the second vendor account. For example, first vendor account provided influence by effectively providing a context in which both individuals were able to communicate in order to arrive at a final decision regarding the product purchase. The provided context can be, for example, both individuals having a conversation at the first vendor's physical retail space or as respective user accounts logged onto the first vendor's remote ecommerce software platform and interacting on the ecommerce software platform.

Upon receipt of the request to initiate the product purchase transaction, the external sales protocol engine (and/or the attribution engine) applies business rules and/or payment rules as described herein to a determine a transaction allocation (i.e. network fee, network fee payment) for the first user account as described herein. In addition, a transaction allocation for the first vendor account is further determined as well. It is understood that any functionality and/or data described herein may be implemented, utilized and/or generated (in whole or partially) by the external sales protocol engine.

In various embodiments, a coseller account may be a source of a coupon or digital currency that is made available to other coseller accounts. For example, a coseller account may create a coupon for a discount on a purchase of a particular product and other coseller accounts may publish respective digital media identifiers on various remote software platforms that are embedded with product data and data identifying the coupon and the coseller account that created the coupon. As such, the coseller account that created the coupon (or digital currency) will be included in the provenance data and qualify for a network fee based on an allocation of the transaction cost commensurate with an amount of influence generated by the coupon (or digital currency). Additional examples of various types of coseller accounts include, but are not limited to: a source that provides an auction of a particular product available on the attribution platform and/or a coseller account that places an unsuccessful bid for the particular product during the auction.

An additional type of coseller account may represent an internet service provider (or telecommunications service provider) used by another coseller account to access the attribution platform and/or publish a digital media identifier. A proxy server service may further be represented as a coseller account. For example, the proxy server service may provide functionality related to digital wallet storage, management and upfront payment of network fees to various coseller accounts. For example, an upfront payment of network fees may be an advance payment to a coseller account in anticipation of the coseller account being successful in generating a measure of influence in a future transaction.

Figure 15:
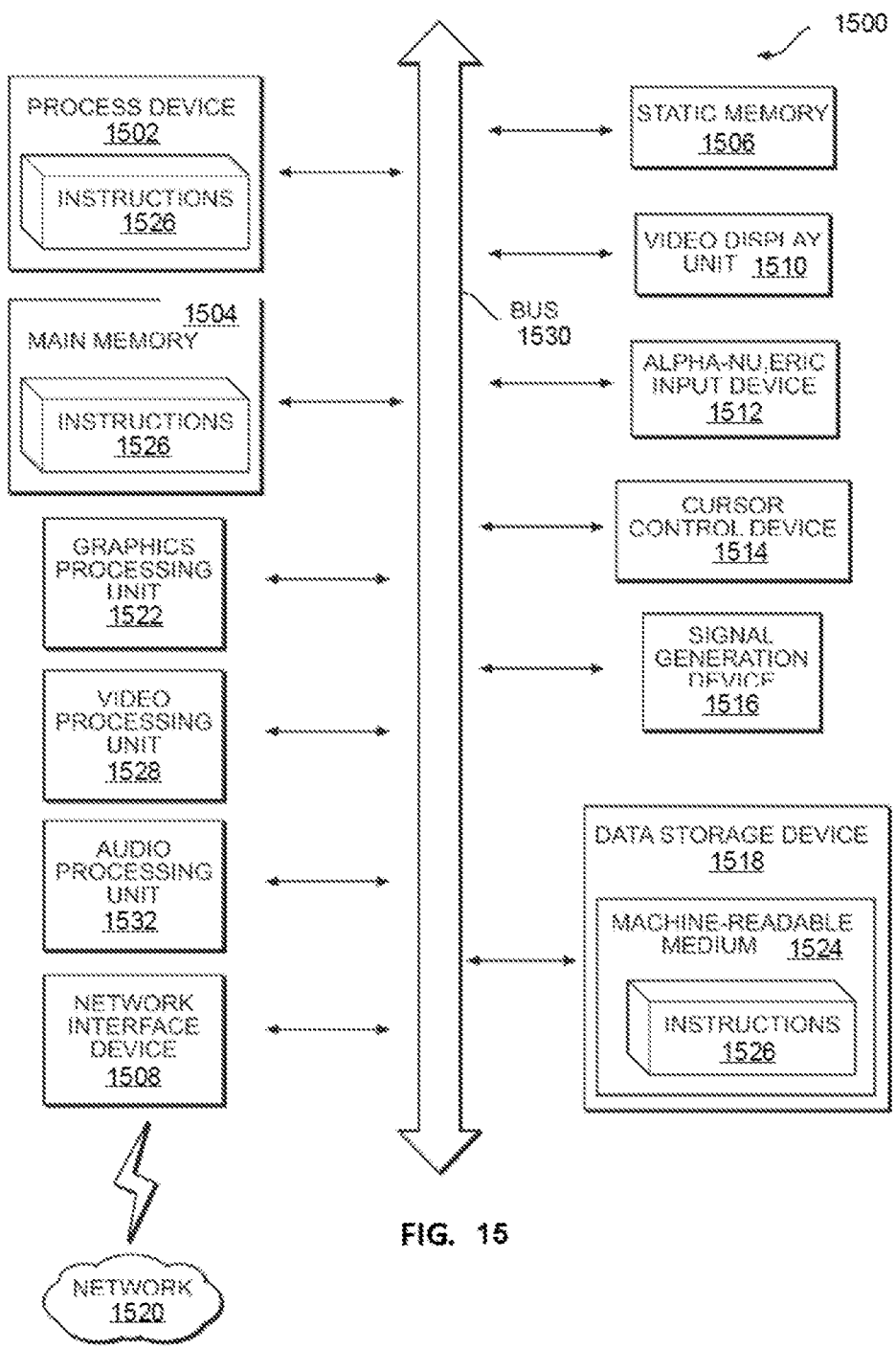
FIG. 15 is a diagram illustrating an exemplary environment in which some embodiments may operate.

FIG. 15 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1500 includes a processing device 1502, a main memory 1504 (e.g., read-only memory (ROM), flash memory, dynamic random access memory (DRAM) such as synchronous DRAM (SDRAM) or Rambus DRAM (RDRAM), etc.), a static memory 1506 (e.g., flash memory, static random access memory (SRAM), etc.), and a data storage device 1518, which communicate with each other via a bus 1530.

Processing device 1502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. The processing device 1502 is configured to execute instructions 1526 for performing the operations and steps discussed herein.

The computer system 1500 may further include a network interface device 1508 to communicate over the network 1520. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), a graphics processing unit 1522, a signal generation device 1516 (e.g., a speaker), graphics processing unit 1522, video processing unit 1528, and audio processing unit 1532.

The data storage device 1518 may include a machine-readable storage medium 1524 (also known as a computer-readable medium) on which is stored one or more sets of instructions or software 1526 embodying any one or more of the methodologies or functions described herein. The instructions 1526 may also reside, completely or at least partially, within the main memory 1504 and/or within the processing device 1502 during execution thereof by the computer system 1500, the main memory 1504 and the processing device 1502 also constituting machine-readable storage media.

In one implementation, the instructions 1526 include instructions to implement functionality corresponding to the components of a device to perform the disclosure herein. While the machine-readable storage medium 1524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising:
   prior to publication of a first digital media identifier on a remote software platform separate from an attribution software platform:
      receiving, by the attribution software platform and from a first user account, a selection of an identification of a product from a catalog of a vendor user account listed on the attribution software platform;
      generating, by the attribution software platform, the first digital media identifier based at least in part on the selected identification, wherein the generating the first digital media identifier further comprises encoding one or more portions of the first digital media identifier representing a first account identifier of the first user account and the identification of the product;
      storing, by the attribution software platform, a first provenance data in a first provenance of the first digital media identifier;
      providing, by the attribution software platform, the first digital media identifier to the first user account;
   after publication of an instance of the first digital media identifier on the remote software platform:
      receiving, by the attribution software platform and from the remote software platform, an interaction data associated with an interaction by a remote software platform user account with the published instance of the first digital media identifier, wherein a second user account on the attribution software platform is associated with the remote software platform user account;
      in response to the received interaction data, generating, by the attribution software platform, a second digital media identifier related to the second user account;
      encoding, by the attribution software platform, one or more portions of the second digital media identifier as referring to the first digital media identifier, wherein the encoding one or more portion of the second digital media identifier comprises:
         encoding a first portion of the second digital media identifier to identify the product;
         encoding a second portion of the second digital media to identify the second user account; and
         encoding a third portion of the second digital media identifier to identify the first digital media identifier;
      storing, by the attribution software platform, a second provenance data in a second provenance of the second digital media identifier;
      receiving, by the attribution software platform, a transaction request comprising the second digital media identifier;
      decoding, by the attribution software platform, one or more portions of the received second digital media identifier, wherein the decoding one or more portions of the second digital media identifier further comprises identifying the first digital media identifier from the one or more decoded portions of the second digital media identifier; and
      determining, by the attribution software platform, network fees associated with the transaction request for purchase of the product based on the decoded second digital media identifier, the second provenance and the first provenance.

2. The computer-implemented method of claim 1, further comprising:

accessing, by the attribution software platform, one or more payment rules associated with the first digital media identifier;

accessing, by the attribution software platform, the first provenance of the first digital media identifier;

accessing, by the attribution software platform, the second provenance of the second digital media identifier;

identifying, by the attribution software platform, at least one payment rule that attributes a first transaction allocation to the first provenance of the first digital media identifier; and identifying, by the attribution software platform, at least one payment rule that attributes a second transaction allocation to the second provenance of the second digital media identifier.

3. The computer-implemented method of claim 2, wherein the identifying at least one payment rule that attributes a first transaction allocation to the first provenance of the first digital media identifier comprises:

determining, by the attribution software platform, a first network fee for the first user account resulting from applying the first transaction allocation to a transaction cost identified in the transaction request; and wherein the identifying at least one payment rule that attributes a second transaction allocation to the second provenance of the second digital media identifier comprises:

determining a second network fee for the second user account resulting from applying the second transaction allocation to the transaction cost identified in the transaction request.

4. The computer-implemented method of claim 1, wherein the storing a first provenance data associated with a first provenance of the first digital media identifier comprises:

storing an indication that the first digital media identifier corresponds to the first user account; and storing an indication of an external publication of the first digital media identifier.

5. The computer-implemented method of claim 4, wherein prior to the publication of the first digital media identifier on the remote software platform, the method further comprising:

receiving, by the attribution software platform, an identification of the remote software platform from the first user account; and storing, by the attribution software platform, an indication that the first digital media identifier corresponds to the identification of the remote software platform.

6. A system comprising:

an attribution software platform comprising one or more processors, and a non-transitory computer-readable medium storing one or more sequences of instructions that, when executed by the one or more processors, cause the one or more processors to perform operations comprising:

prior to publication of a first digital media identifier on a remote software platform separate from the attribution software platform:

receiving, from a first user account, a selection of an identification of a product from a catalog of a vendor user account listed on the attribution software platform;

generating the first digital media identifier based at least in part on the selected identification, wherein the generating the first digital media identifier further comprises encoding one or more portions of the first digital media identifier representing a first account identifier of the first user account and the identification of product;

storing a first provenance data in a first provenance of the first digital media identifier;

providing the first digital media identifier to the first user account;

after publication of an instance of the first digital media identifier on the remote software platform:

receiving, from the remote software platform, an interaction data associated with an interaction by a remote software platform user account with the published instance of the first digital media identifier, wherein a second user account on the attribution software platform is associated with the remote software platform user account;

in response to the received interaction data, generating a second digital media identifier related to the second user account;

encoding one or more portions of the second digital media identifier as referring to the first digital media identifier, wherein the encoding one or more portion of the second digital media identifier comprises:

encoding a first portion of the second digital media identifier to identify the product;

encoding a second portion of the second digital media to identify the second user account; and encoding a third portion of the second digital media identifier to identify the first digital media identifier;

storing a second provenance data in a second provenance of the second digital media identifier;

receiving a transaction request comprising the second digital media identifier;

decoding one or more portions of the received second digital media identifier, wherein the decoding one or more portions of the second digital media identifier further comprises identifying the first digital media identifier from the one or more decoded portions of the second digital media identifier; and determining network fees associated with the transaction request for purchase of the product based on the decoded second digital media identifier, the second provenance and the first provenance.

7. The system of claim 6, wherein the instructions, when executed by the one or more processors, further cause the one or more processors to perform operations comprising:

accessing one or more payment rules associated with the first digital media identifier;

accessing the first provenance of the first digital media identifier;

accessing the second provenance of the second digital media identifier;

identifying at least one payment rule that attributes a first transaction allocation to the first provenance of the first digital media identifier; and identifying at least one payment rule that attributes a second transaction allocation to the second provenance of the second digital media identifier.

8. The system of claim 7, wherein the identifying at least one payment rule that attributes a first transaction allocation to the first provenance of the first digital media identifier comprises:

determining a first network fee for the first user account resulting from applying the first transaction allocation to a transaction cost identified in the transaction request; and wherein the identifying at least one payment rule that attributes a second transaction allocation to the second provenance of the second digital media identifier comprises:

determining a second network fee for the second user account resulting from applying the second transaction allocation to the transaction cost identified in the transaction request.

9. The system of claim 6, wherein the storing data associated with a first provenance of the first digital media identifier comprises:

storing an indication that the first digital media identifier corresponds to the first user account; and storing an indication of an external publication of the first digital media identifier;

wherein prior to the publication of the first digital media identifier on the remote software platform, the instructions, when executed by the one or more processors, further cause the one or more processors to perform the operations of:

receiving an identification of the remote software platform from the first user account; and storing an indication that the first digital media identifier corresponds to the identification of the remote software platform.

10. A computer program product comprising a non-transitory computer-readable medium storing computer-readable program instructions that, when executed by one or more processors of an attribution software platform, cause the one or more processors to perform steps comprising:

prior to publication of a first digital media identifier on a remote software platform separate from the attribution software platform:

receiving, from a first user account, a selection of an identification of a product from a catalog of a vendor user account listed on the attribution software platform;

generating the first digital media identifier based at least in part on the selected identification, wherein the generating the first digital media identifier further comprises encoding one or more portions of the first digital media identifier representing a first account identifier of the first user account and the identification of product;

storing a first provenance data in a first provenance of the first digital media identifier;

providing the first digital media identifier to the first user account;

after publication of an instance of the first digital media identifier on the remote software platform:

receiving, from the remote software platform, an interaction data associated with an interaction by a remote software platform user account with the published instance of the first digital media identifier, wherein a second user account on the attribution software platform is associated with the remote software platform user account;

in response to the received interaction data, generating a second digital media identifier related to the second user account;

encoding one or more portions of the second digital media identifier as referring to the first digital media identifier, wherein the encoding one or more portion of the second digital media identifier comprises:

encoding a first portion of the second digital media identifier to identify the product;

encoding a second portion of the second digital media to identify the second user account; and encoding a third portion of the second digital media identifier to identify the first digital media identifier;

storing a second provenance data in a second provenance of the second digital media identifier;

receiving a transaction request comprising the second digital media identifier;

decoding one or more portions of the received second digital media identifier, wherein the decoding one or more portions of the second digital media identifier further comprises identifying the first digital media identifier from the one or more decoded portions of the second digital media identifier; and determining network fees associated with the transaction request for purchase of the product based on the decoded second digital media identifier, the second provenance and the first provenance.

11. The computer program product of claim 10, wherein the instructions, when executed by the one or more processors, further cause the one or more processors to perform steps comprising:

accessing one or more payment rules associated with the first digital media identifier;

accessing the first provenance of the first digital media identifier;

accessing the second provenance of the second digital media identifier;

identifying at least one payment rule that attributes a first transaction allocation to the provenance of the first digital media identifier; and identifying at least one payment rule that attributes a second transaction allocation to the second provenance of the second digital media identifier.

12. The computer program product of claim 11, wherein the identifying at least one payment rule that attributes a first transaction allocation to the first provenance of the first digital media identifier comprises:

determining a first network fee for the first user account resulting from applying the first transaction allocation to a transaction cost identified in the transaction request; and wherein the identifying at least one payment rule that attributes a second transaction allocation to the second provenance of the second digital media identifier comprises:

determining a second network fee for the second user account resulting from applying the second transaction allocation to the transaction cost identified in the transaction request.

13. The computer program product of claim 10, wherein the storing a first provenance data associated with a first provenance of the first digital media identifier comprises:

storing an indication that the first digital media identifier corresponds to the first user account; and storing an indication that the first digital media identifier corresponds to the external publication;

wherein prior to the publication of the first digital media identifier on the remote software platform, the instructions, when executed by the one or more processors, further cause the one or more processors to perform the steps of:

receiving an identification of the remote software platform from the first user account; and storing an indication that the first digital media identifier corresponds to the identification of the remote software platform.

14. A system comprising:

an attribution software platform comprising one or more processors, and a non-transitory computer-readable medium storing one or more sequences of instructions that, when executed by the one or more processors, cause the one or more processors to perform operations comprising:

receiving a request from a first attribution user account, wherein the request is for initiation of generation of an initial instance of a first digital media identifier associated with product data selected by the first attribution user account, wherein the product data is stored at the attribution software platform;

generating the initial instance of the first digital media identifier, wherein the generating the initial instance of the first digital media identifier further comprises:
  encoding a first portion of the initial instance of the first digital media identifier identifying the first user attribution account; and
  encoding a second portion of the initial instance of the first digital media identifier identifying the product data;

storing at a first location in a persistent ledger of the attribution software platform, the first digital media identifier-in association with a first provenance data;

receiving an interaction data of an interaction on a first remote social network software platform with a published instance of the first digital media identifier on the first remote social network software platform by a first social network user account, wherein the first social network user account is linked to the first attribution user account associated with publication of the published instance of the first digital media identifier on the first remote social network software platform;

determining the interaction with the published instance of the first digital media identifier on the first remote social network software platform is associated with social network activity of a second social network user account that corresponds to a second attribution user account of the attribution software platform;

based on the determination, detecting the interaction as a request from the second attribution user account for generation of a second digital media identifier that references the product data;

generating the second digital media identifier, wherein the generating the second digital media identifier further comprises:
  encoding a first portion of the second digital media identifier with the production data;
  encoding a second portion of the second digital media identifier with information of the second attribution user account; and
  encoding a third portion of the second digital media identifier with the first location of the first digital media identifier in the persistent ledger referenceable by a decoded version of the second portion of the second digital media identifier; and storing at a second location in the persistent ledger, the second digital media identifier in association with a second provenance data;

receiving a transaction request comprising the second digital media identifier;

decoding one or more portions of the received second digital media identifier, wherein the decoding one or more portions of the second digital media identifier further comprises identifying the first digital media identifier from the one or more decoded portions of the second digital media identifier; and determining network fees associated with the transaction request for purchase of a product associated with the product data based on the decoded second digital media identifier, the second provenance and the first provenance.

15. The computer-implemented method of claim 1, wherein prior to the publication of the first digital media identifier on the remote software system, the method further comprises:

receiving, by the attribution software platform, an identification of the remote software platform selected by the first user account;

storing, by the attribution software platform, the first provenance data associated with the first provenance of the first digital media identifier on a persistent ledger, wherein a portion of the first provenance data associated with the first provenance is based at least in part on the identification of the remote software platform selected by the first user account.

16. The computer implemented method of claim 15, wherein the receiving an identification of the remote software platform selected by the first user account comprises:

receiving an identification of a remote social network platform selected by the first user account.

17. The computer-implemented method of claim 1, further comprising:

prior to the publication of the first digital media identifier on the remote software platform:
  receiving, by the attribution software platform, an identification of the remote software platform selected by the first user account;

after publication of an instance of the second digital media identifier by the second user account on the remote software platform:
  receiving, by the attribution software platform, additional interaction data associated with a second interaction with the second digital media identifier on the remote software platform by a third user account, the third user account comprising a third user account for accessing the remote software platform having a corresponding third user account for accessing the attribution software platform; and
  in response to the received additional interaction data related to the further interaction by the third user account, generating, by the attribution software platform, a third digital media identifier related to the second interaction by the third user account, wherein the third digital media identifier comprises one or more encoded portions referring to the second digital media identifier.

* * * * *